(12) United States Patent
Ishaaya et al.

(10) Patent No.: US 9,645,310 B2
(45) Date of Patent: May 9, 2017

(54) SINGLE LARGE MODE CLADDING AMPLIFICATION IN ACTIVE DOUBLE-CLAD FIBERS

(71) Applicant: B.G. Negev Technologies and Applications Ltd., Beer Sheva (IL)

(72) Inventors: Amiel Ishaaya, Nes Ziona (IL); Eitan Ronen, Rehovot (IL)

(73) Assignee: B.G. Negev Technologies and Applications Ltd., Beer Sheva (IL)

( * ) Notice: Subject to any disclaimer, the term of this patent is extended or adjusted under 35 U.S.C. 154(b) by 0 days.

(21) Appl. No.: 14/906,295

(22) PCT Filed: Jul. 23, 2014

(86) PCT No.: PCT/IL2014/050668
§ 371 (c)(1),
(2) Date: Jan. 20, 2016

(87) PCT Pub. No.: WO2015/011706
PCT Pub. Date: Jan. 29, 2015

(65) Prior Publication Data
US 2016/0170138 A1    Jun. 16, 2016

Related U.S. Application Data

(60) Provisional application No. 61/858,130, filed on Jul. 25, 2013.

(51) Int. Cl.
*G02B 6/36* (2006.01)
*G02B 6/036* (2006.01)
(Continued)

(52) U.S. Cl.
CPC ...... *G02B 6/03638* (2013.01); *H01S 3/06733* (2013.01); *H01S 3/08045* (2013.01); *H01S 3/094007* (2013.01)

(58) Field of Classification Search
USPC .......................................... 385/126
See application file for complete search history.

(56) References Cited

U.S. PATENT DOCUMENTS 9,001,414 B2 * 4/2015 Mattsson ............ H01S 3/06754
                                                           359/341.3
9,151,889 B2 * 10/2015 Dong ................ C03B 37/01217
2005/0024716 A1  2/2005 Nilsson et al.

FOREIGN PATENT DOCUMENTS

WO        00/02290 A1    1/2000
WO    2007/107164 A2    9/2007
(Continued)

OTHER PUBLICATIONS

Mattsson, Low photo darkening single mode RMO fiber, Optics Express, Sep. 2009, 7 pages.
(Continued)

*Primary Examiner* — Eric Wong
(74) *Attorney, Agent, or Firm* — Roach Brown McCarthy & Gruber, P.C.; Kevin D. McCarthy

(57) ABSTRACT

The invention is an active double-clad fiber comprising the following four layers: a high refractive index small diameter core; an inner annular clad layer doped with active ions surrounding the core; an outer annular clad layer surrounding the inner clad layer; and an annular low refractive index outer coating layer surrounding the outer clad layer. The structure of the fiber of the invention and the properties of the materials of its layers provides high discrimination against higher modes, thereby maintaining single mode operation in laser systems. The diameter of the core of the fiber of the invention is much smaller than the diameter of the large single transverse mode that it guides, thereby allowing guiding and amplification to take place mainly in the inner doped clad layer.

7 Claims, 4 Drawing Sheets

(51) Int. Cl.
H01S 3/067 (2006.01)
H01S 3/08 (2006.01)
H01S 3/094 (2006.01)

(56) References Cited

FOREIGN PATENT DOCUMENTS

WO 2008/046159 A1 4/2008
WO 2010060435 A1 6/2010

OTHER PUBLICATIONS

Nilsson et al., Ring-doped cladding-pumped single-mode three-level fiber laser; Optics Letters, Mar. 1998, 3 pages.
International Search Report from a counterpart foreign application—PCT/IL2014/050668—mailed Nov. 4, 2014; 6 pages.
Written Opinion of the International Searching Authority from a counterpart foreign application—PCT/IL2014/050668—mailed Nov. 4, 2014; 5 pages.
Ronen et al., Single large mode cladding amplification in active double-clad fibers, published Thu Jun. 12 12:54:13 2014, 10 pages.
S. Acco, Y. Sintov, Y. Glick, O. Katz, Y. Nafcha, and R. Lavi; Bend-loss control of multi-mode fiber power amplifiers producing single-mode operation, in: Advanced Solid-State Photonics (TOPS), (Optical Society of America, 2005), p. 565 (1 page).
J. K. Sahu, S. Yoo, A. J. Boyland, A. S. Webb, M. Kalita, J. N. Maran, Y. Jeong, J. Nilsson, W. A. Clarkson, and D. N. Payne; Fiber design for high-power fiber lasers, in: Society of Photo-Optical Instrumentation Engineers (SPIE) Conference Series, Society of Photo-Optical Instrumentation Engineers (SPIE) Conference Series, vol. 7195 (Feb. 2009) (13 pages).
J. Limpert, T. Schreiber, S. Nolte, H. Zellmer, T. Tunnermann, R. Iliew, F. Lederer, J. Broeng, G. Vienne, A. Petersson, and C. Jakobsen; High-power air-clad large-mode-area photonic crystal fiber laser, Opt. Expr. 11(7), 818-823 (2003). (6 pages).
B. Shulga and A. Ishaaya; Off-axis pumping of a photonic crystal fiber laser, Appl. Phys. B 101,701-704 (2010) (4 pages).
A. A. Ishaaya, G. Machavariani, N. Davidson, A. A. Friesem, and E. Hasman; Conversion of a high-order mode beam into a nearly gaussian beam by use of a single interferometric element, Opt. Lett. 28(7), 504-506 (2003). (3 pages).
J. Alvarez-Chavez, A. Grudinin, J. Nilsson, P. Turner, and W. Clarkson; Mode selection in high power cladding pumped fibre lasers with tapered section, in: Lasers and Electro-Optics, 1999. CLEO '99. Summaries of Papers Presented at the Conference on, (May 1999), pp. 247-248 (2 pages).
F. Jansen, F. Stutzki, H. J. Otto, M. Baumgartl, C. Jauregui, J. Limped, and A. Tunnermann; The influence of index-depressions in core-pumped Yb-doped large pitch fibers, Opt. Expr. 18(26), 26834-26842 (2010) (9 pages).
D. Marcuse; "Curvature loss formula for optical fibers", J. Opt. Soc. Am. 66(3), 216-220 (1976). (5 pages).
R. Olshansky; "Distortion losses in cabled optical fibers", Appl. Opt. 14(1), 20-21 (1975). (2 pages).
D. Marcuse ;"Microdeformation losses of single-mode fibers", Appl. Opt. 23(7), 1082-1091 (1984). (11 pages).
ISO Standard 11146 (2005) (23 pages).

* cited by examiner

SINGLE LARGE MODE CLADDING AMPLIFICATION IN ACTIVE DOUBLE-CLAD FIBERS

FIELD OF THE INVENTION

The invention is related to the field of optical fibers. Specifically the invention is related to the field of double-clad active fibers.

BACKGROUND OF THE INVENTION

Publications and other reference materials referred to herein, including reference cited therein, are numerically referenced in the following text and respectively grouped in the appended Bibliography which immediately precedes the claims.

In the past decade fiber lasers have become exceedingly widespread and are replacing bulk solid state lasers in diverse applications. The ability to efficiently absorb the pump light by use of double clad fibers, the high gain achieved by long interaction lengths, the favorable heat dissipation configuration, the excellent beam quality dictated by the single mode waveguide, and the ease of alignment, all together make the fiber laser very attractive, combining high output power and excellent beam quality in a reliable and relatively low cost configuration. However, with high CW powers or high peak power pulses, where the intensity in the core is very high, deleterious nonlinear effects and material damage limit the fiber laser performance.

Two main approaches have been developed to overcome this problem. The more straightforward and common approach is using step index fibers with very small refractive index difference Δn between the core and the cladding (often referred to as Large Mode Area (LMA) fibers). These fibers have large cores supporting large transverse mode operation and thus the intensity in the core is reduced. Due to the inability to fabricate fibers with very small Δn this approach is currently limited to modes with less than 30 μm mode field diameter. Furthermore, these fibers are not strictly single mode and coiling should be used to achieve truly single mode operation. This coiling often results in smaller and asymmetric modes and reduced efficiency[1], [2].

The second approach is the use of large single mode, double clad, photonic crystal fibers (PCFs). Here the large single mode cores are achieved by introducing very small air holes in the silica, creating a very small effective Δn. Mode field diameters of 30 μm have been achieved with flexible PCFs and 80 μm with rigid rod-type PCFs. The main disadvantage of this approach is the lack of an "all-fiber" configuration, which results from the difficulty to splice PCFs to side pump couplers, to fiber bragg gratings (FBG) and to end caps. The need for free space light coupling reduces dramatically the robustness of the system [3], [4]. Moreover, the fabrication of PCFs is relatively complicated and costly, with only a few companies offering them commercially.

It is a purpose of the present invention to provide an active double-clad fiber that guides only a single transverse mode that has large overlap with a doped active cladding and has very large mode area with good modal discrimination.

It is another purpose of the invention to provide an active double-clad fiber that is simple to fabricate compared to PCFs.

It is another purpose of the invention to provide an active double-clad fiber that can be spliced and used in an "all-fiber" configuration with improved performance compared to standard active LMA and PCF fibers.

Further purposes and advantages of this invention will appear as the description proceeds.

SUMMARY OF THE INVENTION

The invention is an active double-clad fiber comprising the following four layers:
a. a high refractive index small diameter core;
b. an inner annular clad layer doped with active ions surrounding the core;
c. an outer annular clad layer surrounding the inner clad layer; and
d. an annular low refractive index outer coating layer surrounding the outer clad layer.

The structure of the fiber of the invention and the properties of the materials of its layers provides high discrimination against higher modes, thereby maintaining single mode operation in laser systems. The diameter of the core of the fiber of the invention is much smaller than the diameter of the large single transverse mode that it guides, thereby allowing guiding and amplification to take place mainly in the inner doped clad layer.

In embodiments of the fiber of the invention the mode field diameter reaches at least 80 μm with good modal discrimination.

In embodiments of the fiber of the invention the core can be either doped with active ions or undoped with active ions.

In embodiments of the fiber of the invention the diameter of the core is between 2.5-5% of the diameter of the inner doped clad layer.

In embodiments of the fiber of the invention the refractive indices of the inner and outer clad layers are less than the refractive index of the core and larger than the refractive index of outer coating layer.

In embodiments of the fiber of the invention the refractive indices of the inner and outer clad layers are equal.

In embodiments of the fiber of the invention the refractive index of the outer clad layer is slightly different than the refractive index of the inner clad layer such that the difference between the refractive indices is on the order of $1\text{-}2\times10^{-4}$.

Embodiments of the fiber of the invention comprise a fifth annular layer of rigid material surrounding the outer coating layer.

All the above and other characteristics and advantages of the invention will be further understood through the following illustrative and non-limitative description of embodiments thereof, with reference to the appended drawings.

DETAILED DESCRIPTION OF EMBODIMENTS OF THE INVENTION

The invention is an active double-clad fiber that has a very small core that guides a large single transverse mode having large overlap with a doped active cladding. Under certain circumstances the mode field diameter can reach at least 80 µm with good modal discrimination. It is shown herein below the effect of small refractive index changes in the doped region on the modal discrimination and the sensitivity to fiber bending. The fibers of the invention are relatively simple to fabricate compared to PCFs, can be spliced and used in an "all-fiber" configuration with improved performance compared to standard LMA and PCF fibers. The inventors believe that the design of the fiber of the invention will open new opportunities in robust high power fiber lasers and amplifiers with superior beam quality.

Figure 1A:
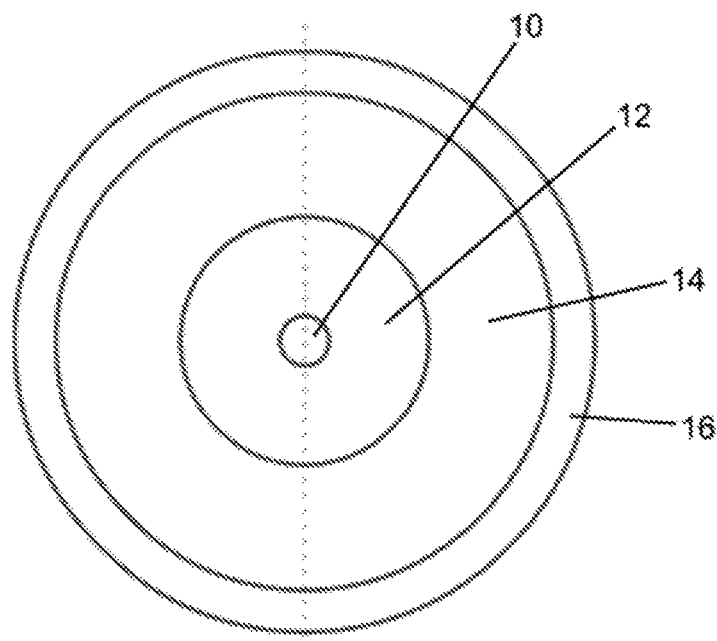
FIG. 1A is a cross-sectional view schematically showing the four layers of the active double-clad fiber of the invention.

FIG. 1A is a cross-sectional view schematically showing the four layers of the active double-clad fiber of the invention. In the center there is a high index small diameter core (10), which can be undoped or doped with active ions. Surrounding the core is a lower index cladding (14), having an inner part (12) close to the core (10) that is doped with active ions. The outer layer 16 of the fiber is a low index polymer coating.

Figure 1B:
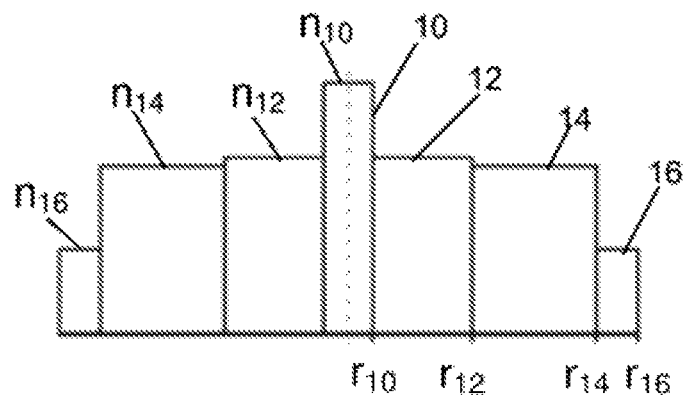
FIG. 1B is a schematic illustration showing the refractive index profile of the double clad active fiber of the invention.

FIG. 1B is a schematic illustration showing the refractive index profile of the double clad active fiber of the invention. In FIG. 1B: $r_{10}$=radius of the core (10), $r_{12}$=radius of the doped region of the cladding (12), $r_{14}$=radius of the cladding (14), and $r_{16}$=radius of the outer layer (16) and $n_{10}$=refractive index of the core (10), $n_{12}$=refractive index of the doped region of the cladding (12), $n_{14}$=refractive index of the cladding (14), and $n_{16}$=refractive index of the outer layer (16). The refractive indices are related as follows:

$$n_{10} > n_{12} \approx n_{14} > n_{16}.$$

It is to be noted that FIGS. 1A and 1B are not drawn to scale and that the radii of the different layers are not proportional to possible values of a fiber of the invention.

Taking into accout the limitations of present day fabrication techniques, typical demensions for the various layers can be: $r_{10}$=1-2 µm; $r_{12}$=40 µm; and $r_{14}$=100-200 µm.

As in standard active double clad fibers, the cladding guides the pump light, which is gradually absorbed by the active ions in the doped region. The core is intended for guiding the laser field, but in the case of the present invention it will be shown herein below that, because the radius of the core is so small relative to that of the doped part of the cladding, the field is not confined in the core but has a large overlap with the doped region of the cladding. In general, if a fiber is to be used for single mode high power laser amplification it must have a large area single transverse mode (core guided), large overlap of this mode with the doped region, and high modal discrimination (low overlap of cladding modes with the doped region). All these requirements are fulfilled by the fiber of the invention.

In order to show the viability of the invention a series of calculations that will now be described were carried out. In carrying out these calculations initially it is assumed that the real part of the refractive index of the doped region in the cladding is exactly equal to that of the undoped region in the cladding and at a later stage the effect of differences in the refractive indices is considered.

If the imaginary part of the refractive index, corresponding to gain in the doped region, is very small compared to the real part of the refractive index (3 orders of magnitude in the case of the fiber of the invention), then the intensity distributions of the modes will not be significantly affected by the presence of the gain. In this case the eigenmodes may be solved analytically without taking into account the presence of gain, and then the gain may be super imposed, and overlap integrals calculated in order to obtain the overall effective gain per mode. To analytically solve for the eigenmodes of the fiber the fiber doping is at first neglected, treating the passive three layer fiber problem. Assuming radial symmetry and the standard weakly guiding approximation $$\left(\text{namely that } \frac{n_{10} - n_{14}}{n_{10}} \approx 1\right)$$

expressions for the eigenmodes of the fiber are obtained.

Figure 2A:
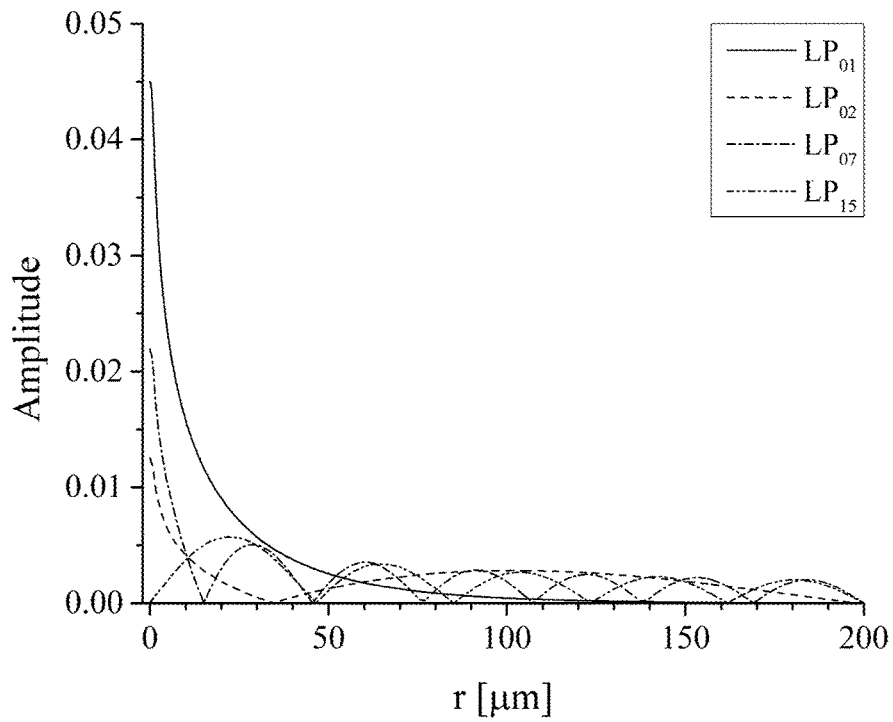
FIG. 2A shows the normalized field amplitude cross sections plotted for different modes.

In FIG. 2A the normalized field amplitude cross sections are plotted for different modes, assuming a core radius of $r_{10}$=1.2 µm; cladding radius $r_{14}$=200 µm; core Numerical Aperture ($NA_{core}$) of 0.104, ($NA_{core}=\sqrt{n_{10}^2-n_{14}^2}$) where $n_{10}$ and $n_{14}$=$n_{12}$ are the core and cladding refractive indicies; and V-number=0.7325

$$\left(V = \frac{2\pi r_{10}}{\lambda} NA_{core},\right.$$

where $r_{10}$ is the core radius, and $\lambda$ is the wavelength). The refractive indexes of the two outer layers, $n_{14}$ and $n_{16}$, are 1.46 and 1.4 so as to create a multimode waveguide with pump Numerical Aperature $NA_{core}$=0.41. Nevertheless because of the high V number of this waveguide all the cladding modes will almost not be effected by $NA_{core}$ of this waveguide. As is evident, the lowest order mode $LP_{01}$ (solid line) is guided by the core and its amplitude practically vanishes only at r=100 µm, far away from the cladding boundary. The $LP_{01}$ mode diameter (D4σ), defined according to four times the second order moment of the intensity distribution [5], is about 80 µm (the mode area equals 5000 µm$^2$). This mode diameter is significantly larger than obtained with standard LMA fibers. The second $LP_{02}$ mode (dashed line) is the lowest symmetric mode that is guided by the cladding, however, because it is altered ("scattered") by the core, its overlap with the gain region is low. The $LP_{07}$ mode (dash-dot-dash line) is an example of a symmetric mode which has the largest overlap with the gain region after the $LP_{01}$ mode (minimal modal discrimination). Notice that this mode is less altered by the small core than the $LP_{02}$ mode. The $LP_{15}$ mode (dash-dot-dot-dash line) is the antisymmetric mode with the highest gain (almost not affected by the core) demonstrating that the minimal discrimination of the antisymmetric modes ($LP_{jk}$ for every k, and j>0) can not be much lower than the minimal discrimination of the symmetric modes because they null in the center.

Figure 2B:
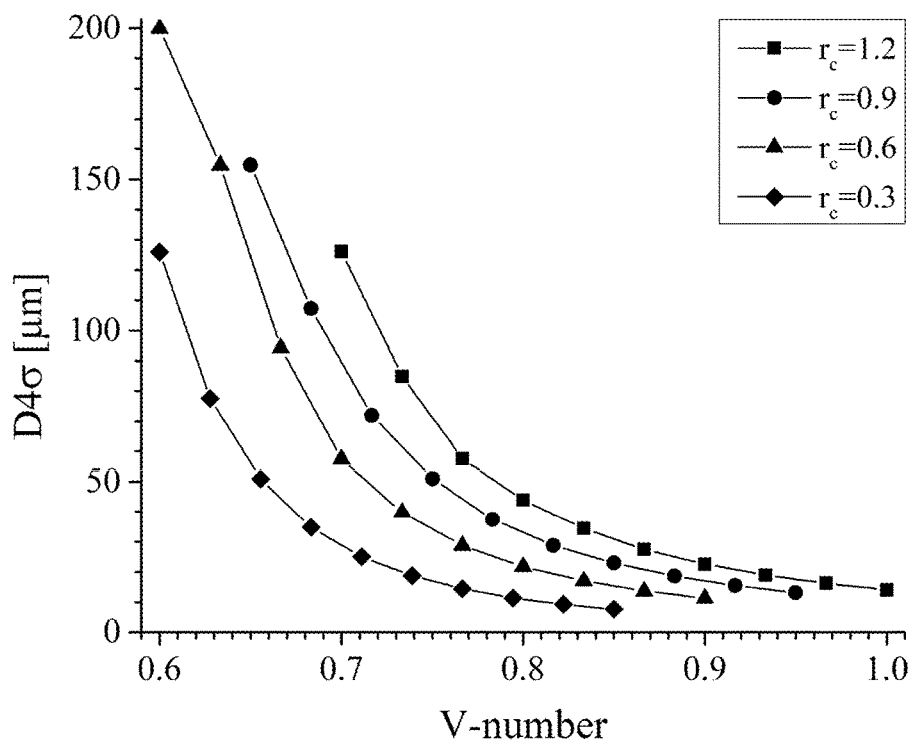
FIG. 2B shows the mode field diameter plotted as a function of the V-number for different core sizes.

In FIG. 2B the mode field diameter (D4σ) is plotted as a function of the V-number for different core sizes. As evident, the diameter decreases as the V-number increases, and for a constant V-number it increases with the core radius. The beam quality factor $M^2$ of the lowest order mode ($LP_{01}$) is $M_{x,y}^2 \cong 1.4$ for all configurations. In principle, since this is a spatially coherent single mode it can be efficiently transformed into a Gaussian beam with $M^2=1$ by use of phase plates [6] or adiabatic tapering of wave guides [7] (unlike spatially incoherent multimode lasing in which the $M^2$ can not be improved with out decreasing the power).

Next, in order to calculate the effective gain of each mode, and thus the modal discrimination, it is assumed that the imaginary part of the refractive index in the doped region is small compared to the real part, and equal to $\alpha=-2\cdot 10^{-6}$ (where $n=n_0+i\alpha$ in the core; and $n=n_1+i\alpha$ in the doped region of the cladding). This seems a reasonable maximum value because it corresponds to an intensity increase by a factor of 1000 (30 dB) in 30 cm of propagation, which is valid for all practical purposes (the intensity is $I(z)=I_0 e^{\gamma z}$, where $I_0$ is the initial intensity, $$\gamma = -\frac{4\pi\alpha}{\lambda},$$

z is the propagation distance, and $\lambda$ is the wavelength). Under this assumption of small $\alpha$'s the doping does not alter the modes, and it is possible to estimate the effective gain of each mode by calculating the overlap integral of the "passive" mode with the doped region:

$$\gamma_{\it eff} = -\frac{4\pi\alpha_{\it eff}}{\lambda}$$

$$\alpha_{\it eff} = \alpha \int_0^{2\pi} \int_0^{r_d} \psi(r,\phi)\psi^*(r,\phi) r \, dr \, d\phi$$

where $r_d = r_{12}$ is the radius of the doped region and $\psi$ is the mode field distribution.

Figure 3A:
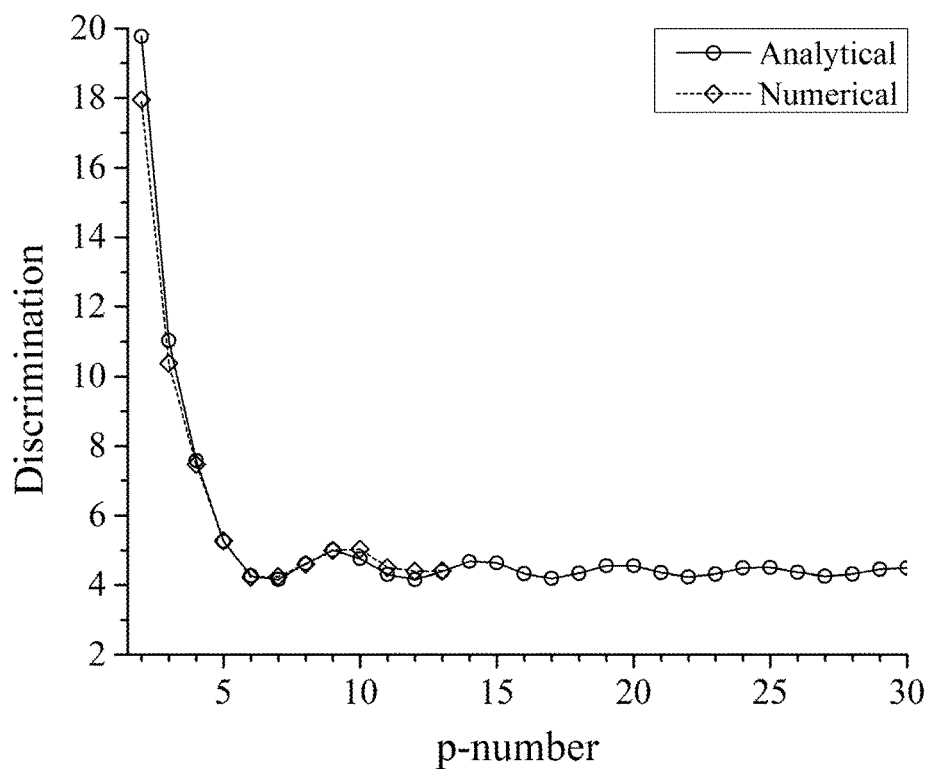
FIG. 3A shows calculated and numerical values of the discrimination between the $LP_{01}$ mode and the high symmetric mode $LP_{0P}$ as a function of the mode number P.

Using the overlap integrals the discrimination (the ratio between the effective gain of $LP_{01}$ mode to that of a higher $LP_{0p}$ mode) was computed as a function of the mode number p, for the case where $r_{10}=1.2$ µm, $r_{14}=200$ µm, $r_{12}=40$ µm, $NA_{core}=0.104$. The results are shown as circles in FIG. 3A. As evident, the minimal discrimination is for the modes near P=7 and is about 4. Numerical results (using commercial Finite Element Method solver) are shown as squares. As shown the analytical and numerical results fully agree. The minimal discrimination between the basic mode and the antisymmetric modes is $$\frac{\gamma_{01}}{\gamma_{15}} = 3.9$$

(analytical results). For smaller radiuses of doping the discrimination between the antisymmetrical modes will be much higher.

Figure 3B:
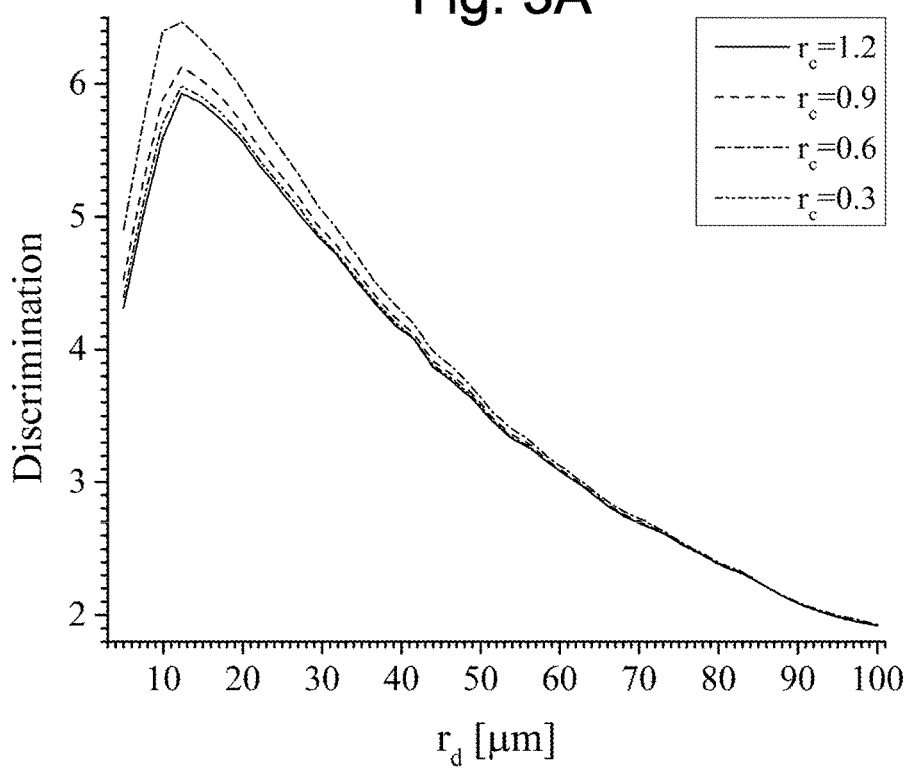
FIG. 3B shows the minimal modal discrimination between the $LP_{01}$ and any other higher mode as a function of the radius of doped region ($r_d$) for different core radiuses.

In FIG. 3B the analytical minimal discrimination between the $LP_{01}$ and higher symmetrical modes is plotted as a function of the radius of doping $r_d$. Different geometrical configurations (i.e. with different core radiuses: $r_c=1.2$ µm—solid line; $r_c=0.92$ µm—dashed line; $r_c=0.6$ µm—dash-dot-dash line; $r_c=0.3$ µm—dash-dot-dot-dash line;) are compared. For all calculated configurations the basic mode diameter is about 80 µm. As seen in FIG. 3B, the gain ratio dependence on the doping radius is similar for the different configurations with small noticeable differences only when $r_{12}$ is smaller than 30 µm. The inventors believe that in the case of a properly designed fiber laser oscillator or amplifier a discrimination of 4 is more than enough for achieving single mode operation. As seen, this corresponds to a doping radius of about 40 µm. For comparison, according to the calculations of the inventors, the corresponding gain ratio in a commercial DC-200/70-PM-Yb-rod PCF fiber is less than 1.5. Nevertheless, if a gain ratio of 4 is not enough, narrowing the doping area can yield a ratio of up to 6. Narrowing of the doped region will increase the overlap between the basic mode central area and the gain region increasing the amplification efficiency, but will also decrease pump absorption which is important for short amplification rigidized configurations.

Next, the fiber robustness is considered against technical limitations. In particular, the sensitivity to small changes of the real part of the refractive index of the doped area (due to the active ion doping) was investigated. It is known that when silica fibers are doped with active ions the real part of the refractive index is changed by a small amount. This can be balanced in general in the fabrication process up to a value of $\Delta n = \pm 10^4$ [8].

Figure 4:
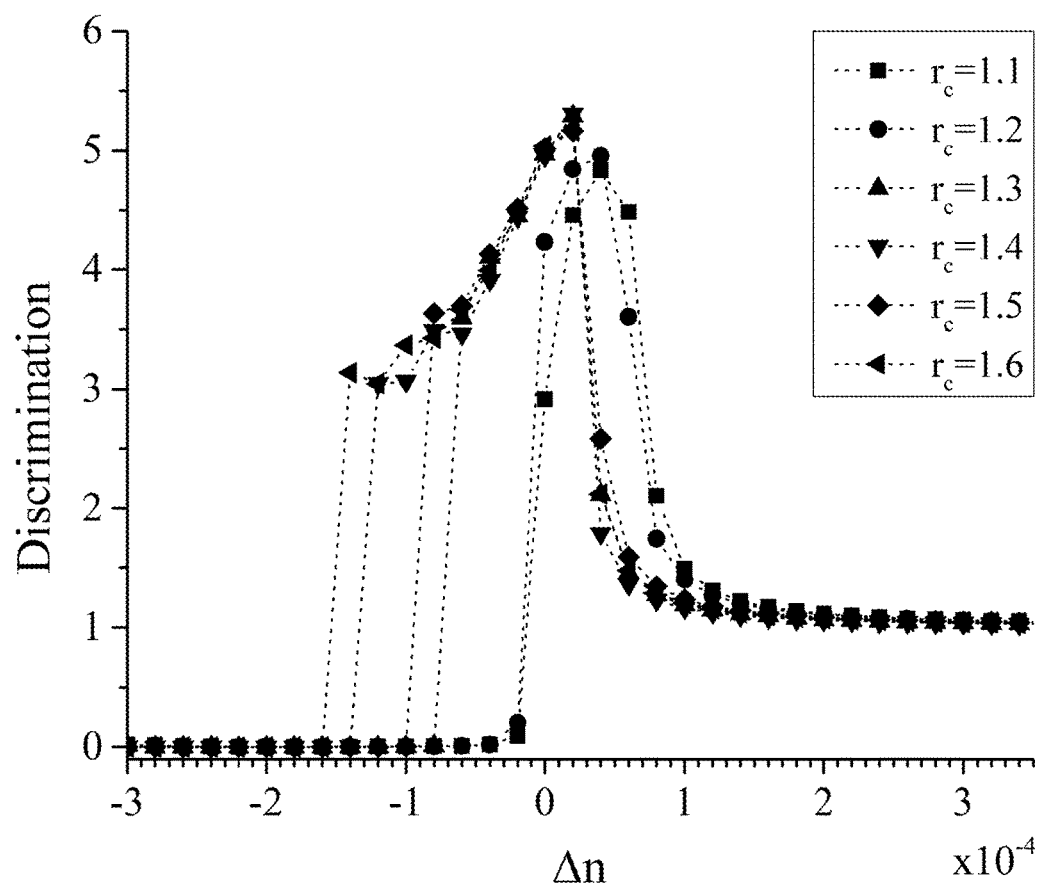
FIG. 4 shows the minimal modal discrimination as a function of the difference in the refractive index between the doped and the undoped sections of clad for fibers of different core radiuses.

FIG. 4 shows the minimal modal discrimination as a function of the difference in the refractive index between the doped and the undoped sections of clad, $n_{12}=n_{14}+\Delta n$ for fibers of different core radiuses all having $r_{12}=40$ µm $n_{12}=1.4637, n_{14}=1.46$. As evident, with increasing $\Delta n$ the modal discrimination decays rapidly, due to competition with intermediate waveguide modes. For negative $\Delta n$ the good modal discrimination is maintained up to some negative value. As seen the tolerance is about $10^4$ for small cores and about $2\cdot 10^{-4}$ for bigger cores (see different curves in FIG. 4), however the latter ones will have smaller mode field diameters. It can be seen that even in the presence of a small $\Delta n$ in the doped region, good modal discrimination can be obtained.

Finally, the loss of the lowest order core-guided mode is examined as a function on the macro radius of curvature (ROC) of the fiber. The loss parameter, $\gamma_2$, was calculated from the formula of Marcuse [9]. For large ROCs, the loss depends exponentially on the ROC. From the inventor's calculations it was found that for all fiber geometries that have a mode diameter of 80 µm, a fiber ROC of about 50 m will result in $$\gamma_2 = -0.1 \left[\frac{1}{m}\right]$$

(−0.4 dBM). This means that practically the fiber can not be coiled. Nevertheless, when holding the fiber straight (e.g. applying slight tension, or rigidizing the fiber) achieving ROC>50 m is possible. For fiber configurations with a basic mode diameter of 120 µm the radius of curvature needed for $$\gamma_2 = -0.1 \left[\frac{1}{m}\right]$$

is ROC>200 m which is harder to achieve. For fiber configurations with a basic mode diameter of 14 µm (e.g. a core radius of 1.2 µm, and V=2), the loss is higher than $$-0.1 \left[\frac{1}{m}\right]$$

(−0.4 dBM) for ROC smaller than 0.25 m. In this case coiling is achievable, however the mode area is significantly smaller. Therefore the choice of modes having 80 µm diameter seems to be a good choice for a short single pass fiber amplifier, assuming the fiber is held straight or rigidized like rod-type PCFs. With this choice the mode area is very large compared to standard LMA fibers, and comparable with that of rod-type PCFs. One should also take into considerations the influences of microbending which cause great losses when the fiber is under tension [10], [11]. The exact loss magnitude caused by the bending depends greatly on the manufacturing capabilities of the particular fiber (smoothness of interfaces in production, materials, thickness of the coating polymers etc.), nevertheless the inventors note this as another motivation for rigidizing the fiber so as to reduce tensions caused by bending. In an embodiment the fiber of the invention can be rigidized by adding a relatively thick fifth annular layer of rigid material surrounding the outer coating layer 16. In embodiments of the fiber this layer can be made of glass and can have a thickness of 0.5 to 1 mm or even more.

To conclude, the present invention presents a new approach for achieving very large mode area active double clad fibers with single mode operation based on a simple structure. When properly designed, these fibers have better performance than standard LMA fibers, with larger single mode area and higher modal discrimination. Compared to large air clad rod-type PCFs these fibers can have comparable mode areas, with better modal discrimination but with tremendous advantages in system robustness due to the possibility to operate in an "all-fiber" configuration.

Although embodiments of the invention have been described by way of illustration, it will be understood that the invention may be carried out with many variations, modifications, and adaptations, without exceeding the scope of the claims.

BIBLIOGRAPHY

[1] S. Acco, Y. Sintov, Y. Glick, O. Katz, Y. Nafcha, and R. Lavi, Bend-loss control of multi-mode fiber power amplifiers producing single-mode operation, in: Advanced Solid-State Photonics (TOPS), (Optical Society of America, 2005), p. 565.
[2] J. K. Sahu, S. Yoo, A. J. Boyland, A. S. Webb, M. Kalita, J. N. Maran, Y. Jeong, J. Nilsson, W. A. Clarkson, and D. N. Payne, Fiber design for high-power fiber lasers, in: Society of Photo-Optical Instrumentation Engineers (SPIE) Conference Series, Society of Photo-Optical Instrumentation Engineers (SPIE) Conference Series, Vol. 7195 (February 2009).
[3] J. Limpert, T. Schreiber, S. Nolte, H. Zellmer, T. Tunnermann, R. Iliew, F. Lederer, J. Broeng, G. Vienne, A. Petersson, and C. Jakobsen High-power air-clad large-mode-area photonic crystal fiber laser, Opt. Expr. 11(7), 818-823 (2003).
[4] B. Shulga and A. Ishaaya Off-axis pumping of a photonic crystal fiber laser, Appl. Phys. B 101, 701-704 (2010).
[5] ISO Standard 11146 (2005).
[6] A. A. Ishaaya, G. Machavariani, N. Davidson, A. A. Friesem, and E. Hasman Conversion of a high-order mode beam into a nearly gaussian beam by use of a single interferometric element, Opt. Lett. 28(7), 504-506 (2003).
[7] J. Alvarez-Chavez, A. Grudinin, J. Nilsson, P. Turner, and W. Clarkson, Mode selection in high power cladding pumped fibre lasers with tapered section, in: Lasers and Electro-Optics, 1999. CLEO '99. Summaries of Papers Presented at the Conference on, (may 1999), pp. 247-248.
[8] F. Jansen, F. Stutzki, H. J. Otto, M. Baumgartl, C. Jauregui, J. Limpert, and A. Tünnermann The influence of index-depressions in core-pumped Yb-doped large pitch fibers, Opt. Expr. 18(26), 26834-26842 (2010).
[9] D. Marcuse Curvature loss formula for optical fibers, J. Opt. Soc. Am. 66(3), 216-220 (1976).
[10] R. Olshansky Distortion losses in cabled optical fibers, Appl. Opt. 14(1), 20-21 (1975).
[11] D. Marcuse Microdeformation losses of single-mode fibers, Appl. Opt. 23(7), 1082-1091 (1984).

The invention claimed is:

1. An active double-clad fiber comprising the following four layers:
   a. a high refractive index core having a radius in the range of 0.3 µm to 2 µm;
   b. an inner annular clad layer doped with active ions surrounding the core having a radius in the range of 30 µm to 50 µm;
   c. an outer annular clad layer having a radius in the range of 100 µm to 200 µm surrounding the inner clad layer; and
   d. an annular low refractive index outer coating layer surrounding the outer clad layer;
   wherein:
   the dimensions and properties of the materials of the layers of the fiber provide discrimination of between 4 and 6 against higher modes, thereby maintaining single mode operation in laser systems;
   the single transverse mode guided by the core has a diameter of at least 80 µm; and
   the diameter of the core is 0.75% to 5% of the diameter of the large single transverse mode, thereby allowing guiding and amplification to take place mainly in the inner doped clad layer, with a large overlap between the guided mode and the inner doped clad layer.

2. The fiber of claim 1, wherein the core is one of: doped with active ions and undoped with active ions.

3. The fiber of claim 1, wherein the diameter of the core is between 2.5-5% of the diameter of the inner doped clad layer.

4. The fiber of claim 1, wherein the refractive indices of the inner and outer clad layers are less than the refractive index of the core and larger than the refractive index of outer coating layer.

5. The fiber of claim 1, wherein the refractive indices of the inner and outer clad layers are equal.

6. The fiber of claim 1, wherein the refractive index of the outer clad layer is different than the refractive index of the inner clad layer such that the difference between the refractive indices is on the order of $1\text{-}2\times10^{-4}$.

7. The fiber of claim 1, comprising a fifth annular layer of rigid material surrounding the outer coating layer.

* * * * *